(12) United States Patent
Stricker et al.

(10) Patent No.: US 11,808,642 B2
(45) Date of Patent: *Nov. 7, 2023

(54) LOW PROFILE SURFACE TEMPERATURE SENSOR

(71) Applicant: WATLOW ELECTRIC MANUFACTURING COMPANY, St. Louis, MO (US)

(72) Inventors: Kit Stricker, St. Louis, MO (US); Art Volbrecht, St. Louis, MO (US); Joe Hoff, St. Louis, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,303

(22) Filed: Jan. 24, 2022

(65) Prior Publication Data

US 2022/0146327 A1 May 12, 2022

Related U.S. Application Data

(63) Continuation of application No. 16/103,528, filed on Aug. 14, 2018, now Pat. No. 11,287,330.

(51) Int. Cl.
*G01K 7/02* (2021.01)
*G01K 1/143* (2021.01)
*G01K 7/04* (2006.01)

(52) U.S. Cl.
CPC ............ *G01K 7/023* (2013.01); *G01K 1/143* (2013.01); *G01K 7/04* (2013.01)

(58) Field of Classification Search
CPC ........... G01K 7/023; G01K 1/143; G01K 7/04

USPC .......................... 374/179, 208, 147
See application file for complete search history.

(56) References Cited

U.S. PATENT DOCUMENTS

| | | | | |
|---|---|---|---|---|
| 3,573,995 | A * | 4/1971 | Senbokuyo | H01L 35/32 374/179 |
| 3,983,753 | A * | 10/1976 | Greenleaf | G01K 1/14 374/E13.002 |
| 2014/0161151 | A1* | 6/2014 | Proctor | G01K 13/02 374/147 |
| 2014/0334517 | A1 | 11/2014 | Blundell et al. | |
| 2015/0101788 | A1* | 4/2015 | Smith | A61F 7/007 62/3.5 |

(Continued)

FOREIGN PATENT DOCUMENTS

| CN | 108507704 A | * | 9/2018 | ............... G01K 1/02 |
|---|---|---|---|---|
| DE | 936537 C | | 12/1955 | |

(Continued)

OTHER PUBLICATIONS

Translation of JPH0854289A (Year: 1996).*

(Continued)

*Primary Examiner* — Mirellys Jagan
(74) *Attorney, Agent, or Firm* — Burris Law, PLLC (57) ABSTRACT

A temperature sensing unit is provided, which includes a temperature sensor for measuring a temperature of an object and a mounting member. The temperature sensor includes a portion bendable to conform to an outer surface of the object. The mounting member has ends attached to opposing ends of the portion of the temperature sensor and securing the temperature sensor on the object.

18 Claims, 9 Drawing Sheets

(56) References Cited

U.S. PATENT DOCUMENTS

2020/0319035 A1* 10/2020 Keenan .................. B65D 23/16

FOREIGN PATENT DOCUMENTS

| | | | | | |
|---|---|---|---|---|---|
| DE | 102012204898 | A1 | * | 10/2013 | ............. G01K 1/143 |
| FR | 773130 | A | * | 11/1934 | |
| FR | 2638522 | A1 | * | 5/1990 | |
| FR | 2811217 | A1 | * | 1/2002 | ............... A61B 5/01 |
| JP | H0854289 | A | * | 2/1996 | |
| WO | WO-2010066556 | A1 | * | 6/2010 | ............. G01K 1/143 |
| WO | WO-2017118834 | A1 | * | 7/2017 | ............. G01K 1/143 |

OTHER PUBLICATIONS

Translation of CN108507704A (Year: 2018).*
Translation of WO2010/066556A1.*
Office Action issued in corresponding EP Application No. 19752829. 2, dated Jan. 3, 2023, 5 pages.

* cited by examiner

LOW PROFILE SURFACE TEMPERATURE SENSOR

CROSS-REFERENCE TO RELATED APPLICATIONS

The present application is a continuation application of U.S. Ser. No. 16/103,528, filed Aug. 14, 2018 and titled "Low Profile Surface Temperature Sensor," the content of which is incorporated herein by reference in its entirety.

FIELD

The present disclosure relates generally to temperature sensors, and more particularly to surface temperature sensors for measuring a surface temperature of a target such as a heater, a heating target, or a chilled target, among others.

BACKGROUND

The statements in this section merely provide background information related to the present disclosure and may not constitute prior art.

Temperature sensors are commonly used with heaters to measure the temperature of the heaters. When a heater has a cylindrical configuration, it may be a challenge to mount the temperature sensor on the curved surface of the heater to measure its surface temperature. If the temperature sensor is not properly mounted, the temperature sensor may not accurately measure the surface temperature of the heater, but instead measure the ambient temperature proximate the heater. Moreover, when there is only a small annular space available around the heater, existing mounting structure may not fit into the small annular space to properly secure the temperature sensor on the curved surface.

The issues with mounting a temperature sensor on a curved surface of a heater, among other issues, are addressed by the present disclosure.

SUMMARY

In one form, a temperature sensing unit is provided, which includes a temperature sensor for measuring a temperature of an object and a mounting member. The temperature sensor includes a portion bendable to conform to an outer surface of the object. The mounting member has ends attached to opposing ends of the portion of the temperature sensor and securing the temperature sensor on the object.

In variations of this form: the portion of the temperature sensor extends around a perimeter of the object; the mounting member is one continuous piece; the mounting member is a spring; the mounting member and the temperature sensor jointly define a continuous, closed geometry; the portion of the temperature sensor is in direct contact with the object; the temperature sensor includes a first thermocouple ribbon and a second thermocouple ribbon that are joined to form a hot junction therebetween; the first thermocouple ribbon and the second thermocouple ribbon are butt-welded; the temperature sensor further includes a support member overlapping the first and second thermocouple ribbons for bonding the first and second thermocouple ribbons together; the first and second thermocouple ribbons each include a first portion extending along a circumferential direction of the object and a second portion extending from the first portion at an angle; in each of the first and second thermocouple ribbons, the second portion is connected to the first portion to define an L shape or a T shape; the temperature sensing unit further includes a mounting flange at an end of the object, wherein the temperature sensor includes a pair of lead wires that are routed through and secured to the mounting flange.

In another form of the present disclosure, a temperature sensing unit for measuring a temperature of an object having a cylindrical configuration is provided. The temperature sensing unit includes a first thermocouple ribbon and a second thermocouple ribbon, and a mounting member. The first thermocouple ribbon and the second thermocouple ribbon each define a first portion extending along a circumferential direction of the object. The first portions of the first and second thermocouple ribbons are joined to define a thermocouple junction and are bendable to conform to an outer surface of the object. The mounting member is directly attached to the first portions of the first and second thermocouple ribbons to secure the first thermocouple ribbon and the second thermocouple ribbons to the object.

In variations of this form: the first thermocouple ribbon and the second thermocouple ribbon are in direct contact with the object; the first thermocouple ribbon and the second thermocouple ribbon each include a second portion extending from a respective one of the first portion at an angle; the temperature sensing unit further includes a pair of lead wires attached to the second portions of the first and second thermocouple ribbons.

In still another form, a temperature sensing unit according to the present disclosure is provided, which includes a temperature sensor for measuring a temperature of an object, and a mounting member. The temperature sensor includes a detecting portion in direct contact with the object. The mounting member secures the detecting portion of the temperature sensor to the object without covering the detecting portion.

In variations of this form: the detecting portion of the temperature sensor and the mounting member jointly define a continuous, closed geometry; the detecting portion is bendable to conform to an outer surface of the object; the temperature sensor includes a first thermocouple ribbon and a second thermocouple ribbon that are joined to define a thermocouple junction.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
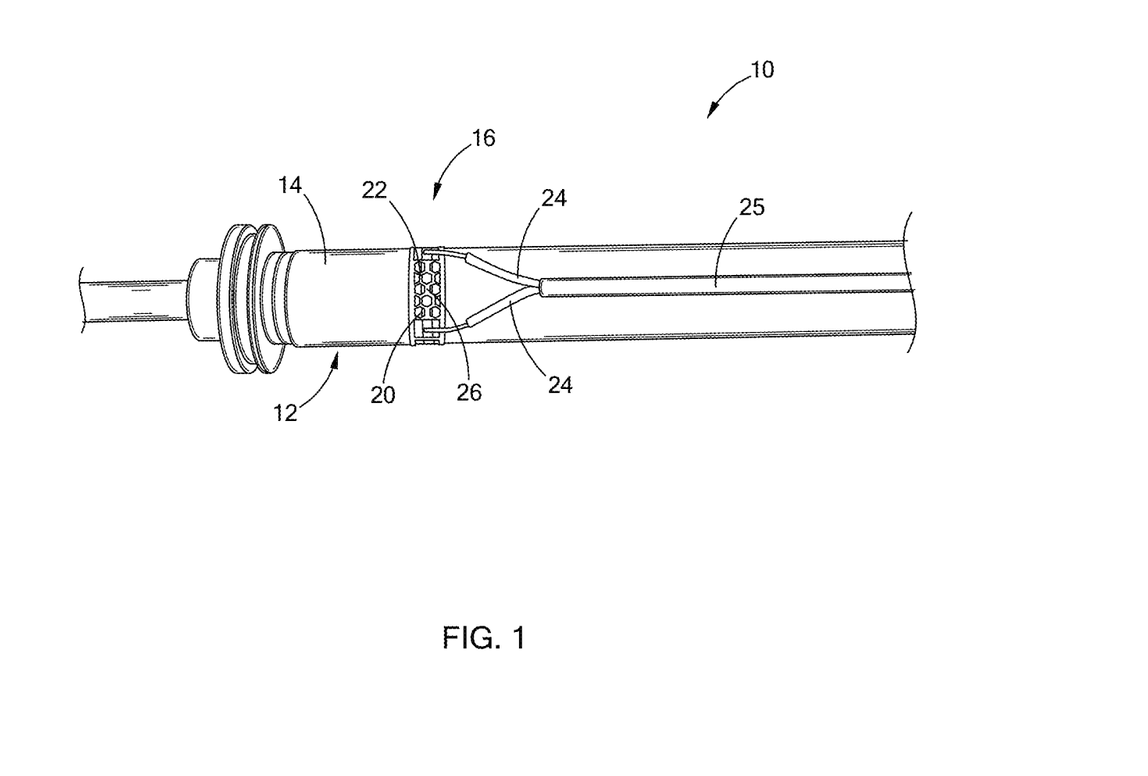
FIG. 1 is a perspective view of a temperature sensing unit mounted on a heater and constructed in accordance with the teachings of the present disclosure.
Figure 2:
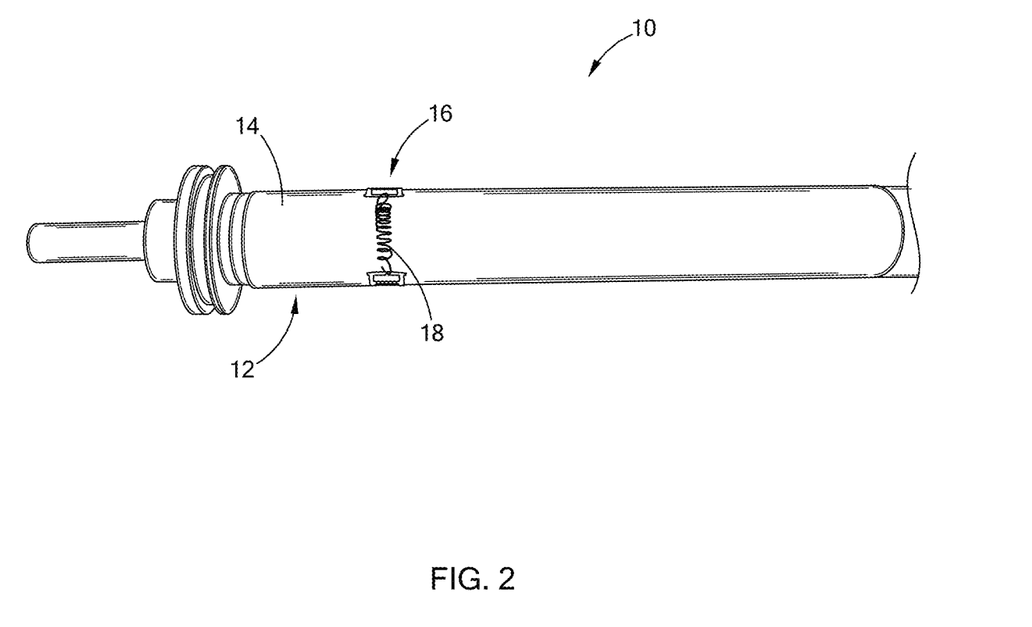
FIG. 2 is another perspective view of a temperature sensing unit of FIG. 1.

Referring to FIGS. 1 and 2, a temperature sensing unit 10 according to the present disclosure is configured to measure a surface temperature of an object, such as a heater 12 or a heating target. In one form, the temperature sensing unit 10 is used for over-temperature protection. As shown, the heater 12 may have a cylindrical configuration and define a curved surface 14. Alternatively, the heater 12 may have another geometrical configuration such as a square, rectangle, or other polygonal shape while remaining within the scope of the present disclosure. Therefore, it should be understood that the temperature sensing unit 10 may be mounted to any heater 12 with an outer perimeter surface, including one as shown having a closed outer curved surface 14.

The temperature sensing unit 10 includes a surface temperature sensor 16 and a mounting member 18 attached to the surface temperature sensor 16 for mounting the surface temperature sensor 16 to the curved surface 14. The surface temperature sensor 16 includes a first thermocouple ribbon 20, a second thermocouple ribbon 22, and a pair of lead wires 24 attached to and extending from the first and second thermocouple ribbons 20, 22. In one form, the lead wires 24 are received and protected by a sheath 25. The first and second thermocouple ribbons 20 and 22 each have a proximal end 30 and a distal end 32 (shown in FIG. 4). The first and second thermocouple ribbons 20 and 22 are joined at the proximal ends 30 to form a hot junction 26 therebetween.

The mounting member 18 is attached to the distal ends 32 of the first and second thermocouple ribbons 20 and 22 such that the first and second thermocouple ribbons 20, 22 and the mounting member 18 jointly define a continuous ring, or a closed shape around the heater 12. The mounting member 18 may be an extension type spring or any elastic means that can provide elastic or spring force to pull the first and second thermocouple ribbons 20 and 22 closer to the curved surface 14. The mounting member 18 applies force, or tension in this case, to hold the first and second thermocouple ribbons 20 and 22 to the curved surface 14 via a wrap-around spring as shown. The force applied by the mounting member 18 to the first and second thermocouple ribbons 20/22 should not exceed the yield strength of the material at the temperature of use. In one form, the material used for the mounting member is a nickel alloy, such as Inconel®, which is capable of operating at higher temperatures, up to about 1,000° C. However, with the shape of the mounting member 18 and its elastic properties, in one form, the material is operated up to about 500° C.

Figure 3:
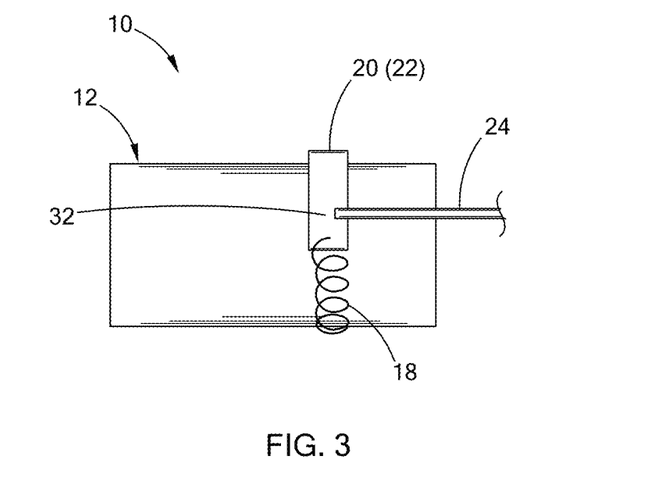
FIG. 3 is a schematic side view of a temperature sensing unit mounted on a heater and constructed in accordance with the teachings of the present disclosure.
Figure 4:
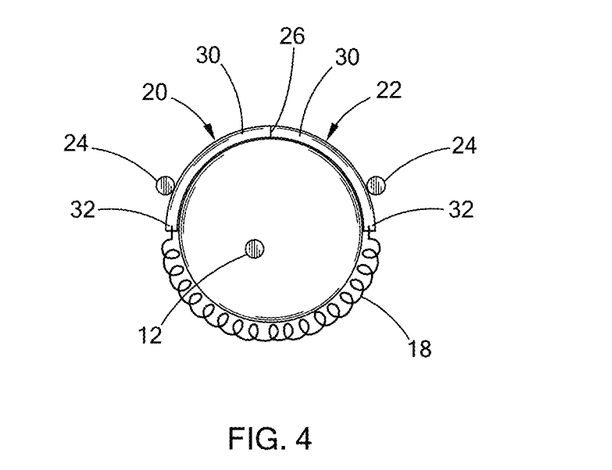
FIG. 4 is a schematic cross-sectional view of a temperature sensing unit mounted on a heater and constructed in accordance with the teachings of the present disclosure.

Referring to FIGS. 3 and 4, the first and second thermocouple ribbons 20 and 22 each include a proximal end 30 and a distal end 32. The mounting member 18 includes opposing ends connected to the distal ends 32 of the first and second thermocouple ribbons 20 and 22. The distal ends 32 of the first and second thermocouples 20, 22 and the opposing ends of the mounting member 18 may be configured to make their connection removable or fixed. For example, in one form, the distal ends 32 of the first and second thermocouple ribbons 20, 22 may define a hole/aperture, and the opposing ends of the mounting member 18 may define a hook to engage the holes of the distal ends 32 of the first and second thermocouple ribbons 20, 22, thereby defining a removable connection. Alternatively, one end of the connection may be removable, while the other end is fixed, for example by way of welding.

The pair of lead wires 24 may be directly connected to the first and second thermocouple ribbons 20, 22 at a location between the proximal ends 30 and distal ends 32. The pair of lead wires 24 transmit signals from the first and second thermocouple ribbons 20 and 22 to an external controller (not shown) that receives the signals and determines a surface temperature of the heater 12 based on the signals, in accordance with the general operating principles of thermocouples, which is understood by those skilled in the art.

Figure 5:
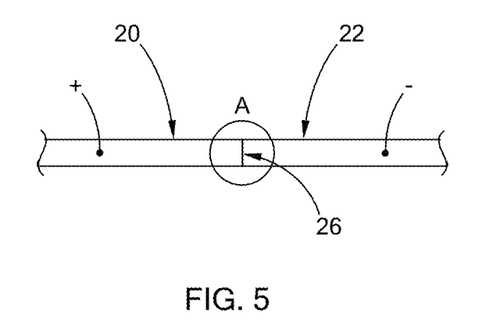
FIG. 5 is a schematic view showing a first form of connection between a first thermocouple ribbon and a second thermocouple ribbon of a surface temperature sensor.

Referring to FIG. 5, the first thermocouple ribbon 20 and the second thermocouple ribbon 22 represent the "+" and "−" legs of the surface temperature sensor 16 and may be butt-welded, or physically joined in any other way, to form the hot junction 26 therebetween.

Figure 6:
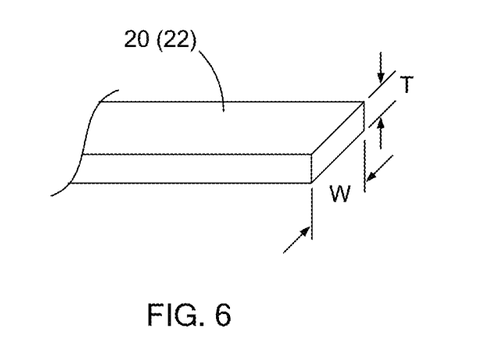
FIG. 6 is a perspective view of a first thermocouple ribbon or a second thermocouple ribbon of FIG. 5.

Referring to FIG. 6, the first and second thermocouple ribbons 20 and 22 each define a thin or low profile so that the first and second thermocouple ribbons 20 and 22 may be slightly bent, or plastically deformed, to conform to the curved surface 14 and such that the surface temperature sensor 16 can have a very low profile or thickness. In one form, the first and second thermocouple ribbons may have a thickness T of approximately 0.004 inches (0.106 mm) and a width W of approximately 0.063 inches (1.6 mm). The first and second thermocouple ribbons 20, 22 may be of the same or different size depending on the specific application. As such, the first and second thermocouple ribbons 20/22 are closer to the curved surface 14 and have an extremely fast response time due to their low profile and lower mass. With such a configuration, the overall temperature sensing unit 10 has a faster response time and is able to inhibit thermal runaway, which is an issue with standard round wires used for conventional thermocouples.

Figure 7:
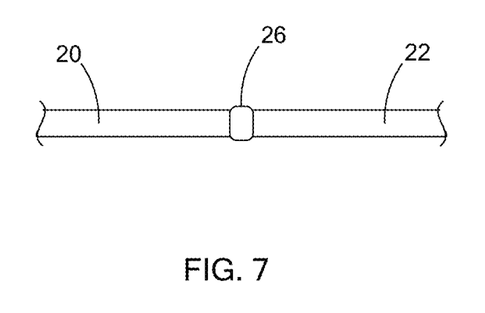
FIG. 7 is an enlarged view of portion A of FIG. 5.

Referring to FIG. 7, when the hot junction 26 is formed by butt-welding, the butt-welded joint should be formed to avoid a welding-related discontinuity on the surface of the first and the second thermocouple ribbons 20, 22. In other words, the welded joint should not protrude that far beyond the upper and lower surfaces of the first and second thermocouple ribbons 20/22 in order to maintain the low profile as set forth above.

Figure 8:
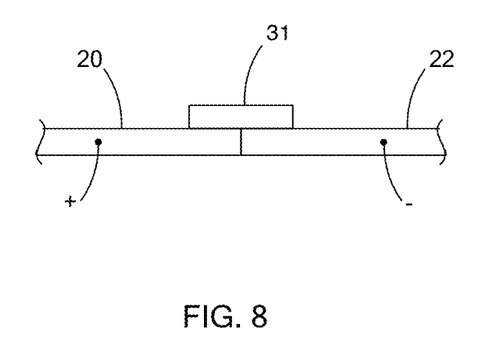
FIG. 8 is a schematic view showing a second form of connection between a first thermocouple ribbon and a second thermocouple ribbon of a surface temperature sensor of a temperature sensing unit in accordance with the teachings of the present disclosure.

Referring to FIG. 8, alternatively, instead of directly connected by butt-welding, the first and second thermocouple ribbons 20, 22 may be indirectly connected by a support strip 31, which overlaps the first and second thermocouple ribbons 20, 22. Using the support strip 31 has the advantage of dissipating heat from the first and second thermocouple ribbons 20, 22 while providing structural support for the first and second thermocouple ribbons 20, 22. Alternatively, instead of using a support strip 31, a wire or any connecting means may be used to connect the first and second thermocouple ribbons 20, 22 together.

Figure 9:
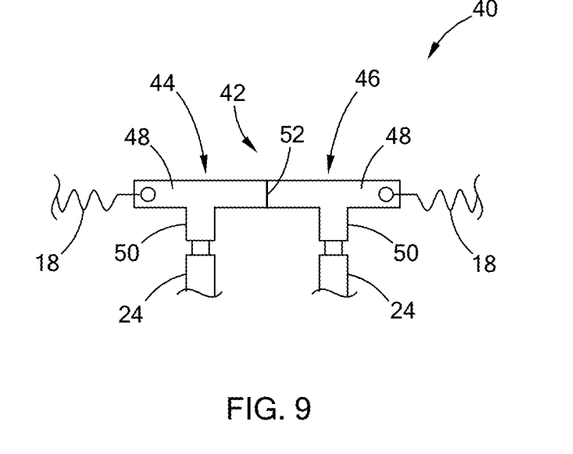
FIG. 9 is a top view of a variant of a temperature sensing unit constructed in accordance with the teachings of the present disclosure.

Referring to FIG. 9, a variant of a temperature sensing unit 40 constructed in accordance with the teachings of the present disclosure is similar to that shown in FIGS. 1 to 4 except for the configuration of the surface temperature sensor 42, particularly the configuration of the first and second thermocouple ribbons 44, 46. Therefore, like elements will be designated by like reference numbers and the detailed description thereof is omitted herein for clarity.

More specifically, the surface temperature sensor 42 of the present embodiment includes a first thermocouple ribbon 44 and a second thermocouple ribbon 46 each defining a "T" configuration as shown. The first and second thermocouple ribbons 44, 46 each include a first portion 48 extending along a circumferential direction of the heater 12 and a second portion 50 extending from a middle of the first portion 48 along a direction substantially parallel to a longitudinal axis of the heater 12. The second portions 50 extend from the first portions 48 at an angle, which may be an acute angle, an obtuse angle or a right angle as shown. A hot junction 52 is formed between adjacent ends of the first portions 48. The hot junction 52 may be formed by butt-welding as shown in FIG. 5, or any other connection means. The mounting member 18 in the form of a spring is connected to distal ends of the first portions 48 that are distal from the adjacent ends. The lead wires 24 are connected to the second portions 50 as shown.

Figure 10:
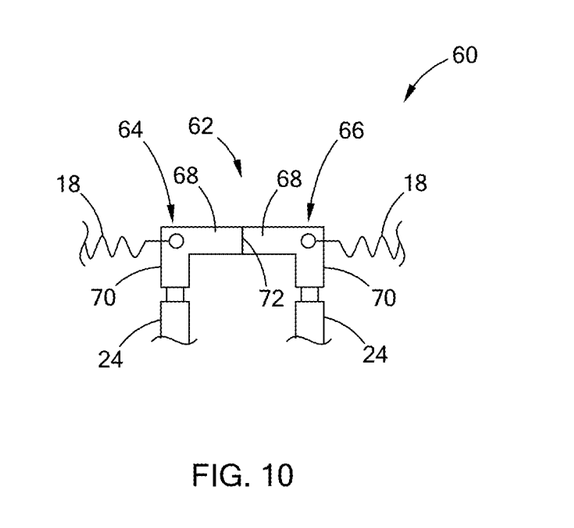
FIG. 10 is a top view of another variant of a temperature sensing unit constructed in accordance with the teachings of the present disclosure.

Referring to FIG. 10, another variant of a temperature sensing unit 60 constructed in accordance with the teachings of the present disclosure is similar to that of FIG. 9 except for the configuration of the first and second thermocouple ribbons 64, 66. More specifically, the temperature sensing unit 60 includes a surface temperature sensor 62 and a mounting member 18 for securing the surface temperature sensor 62 to a surface (e.g., curved) of a heater or a heating target. The surface temperature sensor 62 includes a first thermocouple ribbon 64 and a second thermocouple ribbon 66 each having an "L" shaped configuration as shown. The first and second thermocouple ribbons 64, 66 each have a first portion 68 and a second portion 70 connected to an end of the first position 68, thereby forming an L-shape. The first portions 68 of the first and second thermocouple ribbons 64, 66 are connected to form a hot junction 72 therebetween. The second portions 70 extend in a direction substantially parallel to a longitudinal axis of the heater and are connected to the lead wires 24. While the second portions 70 are shown to be perpendicular to the first portions 68 in FIG. 10, it is understood that the second portions 70 can extend from the first portions 68 at an acute angle or an obtuse angle as long as the second portions 70 protrude from the first portion 68 to facilitate connection of the lead wires 24 to the first and second thermocouple ribbons 64, 66.

Figure 11:
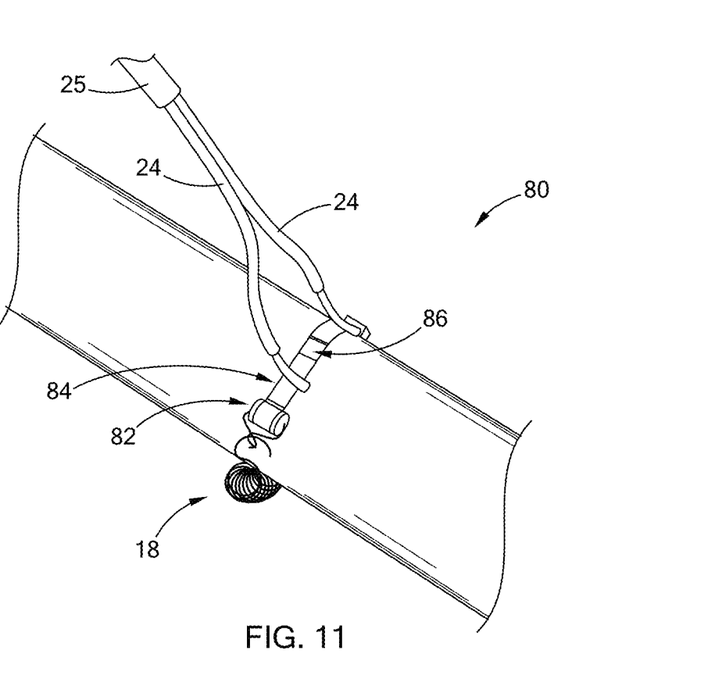
FIG. 11 is a perspective view of still another variant of a temperature sensing unit constructed in accordance with the teachings of the present disclosure.

Referring to FIG. 11, still another variant of a temperature sensing unit 80 constructed in accordance with the teachings of the present disclosure is structurally similar to that of FIGS. 1 to 4 except for an insulator 82 disposed between each of the first and second thermocouple ribbons 84, 86 and an adjacent end of the mounting member 18. The insulators 82 may be ceramic isolators for electrically isolating the mounting member 18 (i.e., spring) from the first and second thermocouple ribbons 84, 86. The ceramic insulators are merely optional and should not be construed as limiting the scope of the present disclosure.

Figure 12:
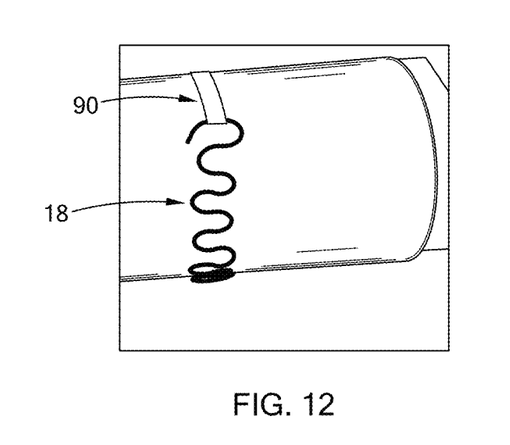
FIG. 12 is a perspective view of still another variant of a temperature sensing unit showing a connection between a surface temperature sensor and a mounting member.

Referring to FIG. 12, a strap 90 may be provided between each of the first and second thermocouple ribbons and the opposing ends of the mounting member 18 to adjust the spring force of the mounting member 18 or to adapt the temperature sensing unit to a heater or a heating target having a particular size. Accordingly, the strap 90 may be considered as a size adjustment member for the temperature sensing unit such that it may be fitted to a variety of shapes and sizes of heaters or heating targets.

Figure 13:
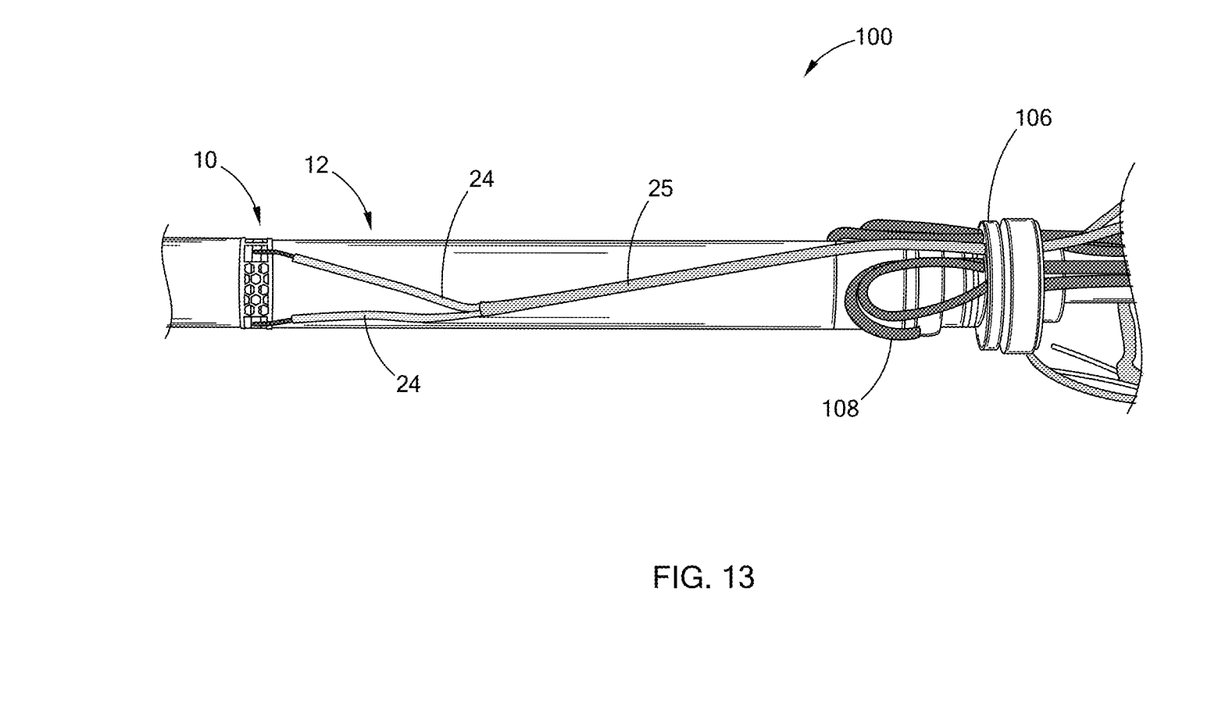
FIG. 13 is a perspective view of a heater assembly including a heater and a temperature sensing unit constructed in accordance with the teachings of the present disclosure.

Referring to FIG. 13, a heater assembly 100 constructed in accordance with the teachings of the present disclosure includes a heater 12, a temperature sensing unit 10, and a mounting flange 106 disposed at an end of the heater 12 and around the heater 102. The temperature sensing unit 16 is structurally similar to any of the various forms of the present disclosure described in connection with FIGS. 1 to 4 and thus like elements are designated by like reference numbers and the detailed description thereof is omitted herein for clarity.

The temperature sensing unit 10 includes a surface temperature sensor 16 and a pair of lead wires 24 extending from the surface temperature sensor 16. The lead wires 24 are received and protected by a sheath 25, which is routed along the length of the heater 12 to the mounting flange 106. The mounting flange 106 includes openings to allow power cables 108 from the heater 12 and the sheath 25 from the temperature sensing unit 10 to pass through. Therefore, the power cables 108 and the sheath 25 may be properly positioned and secured to the mounting flange 106 of the heater 12 without entanglement, providing a lower profile and an organized arrangement of leads for the heater assembly 100.

Figure 14:
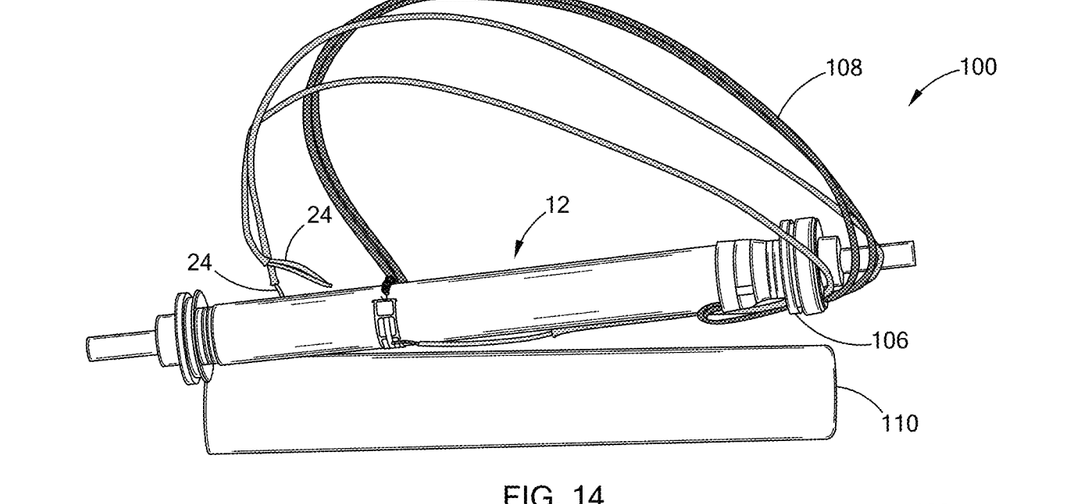
FIG. 14 is a perspective view of a heater assembly to be mounted within a heating target during assembly in accordance with the teachings of the present disclosure.
Figure 15:
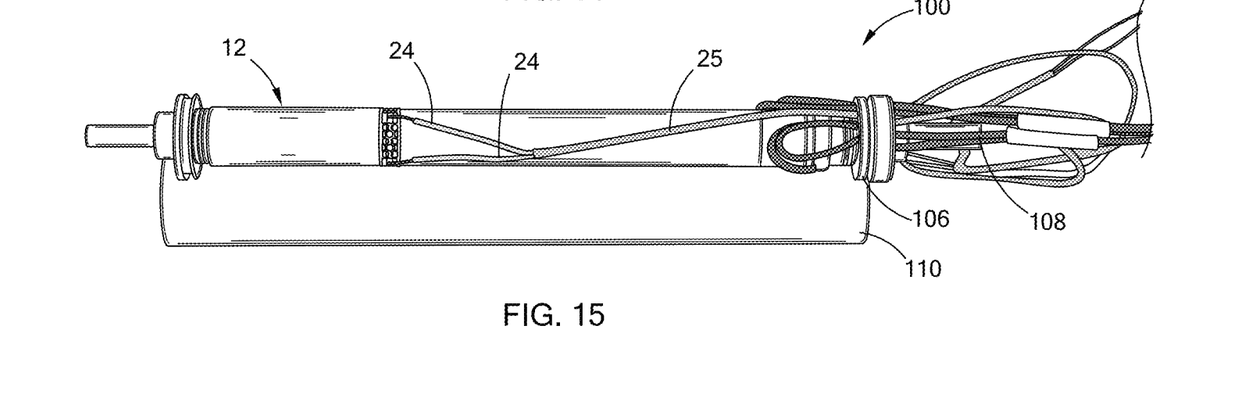
FIG. 15 is a perspective view of a heater assembly to be mounted within a heating target in accordance with the teachings of the present disclosure.

Referring to FIGS. 14 and 15, the heater assembly 100 is shown to be adjacent to a heating target 110, into which the heater assembly 100 is installed. As shown, the power cables 108 and the sheath 25 (or the lead wires 24 if the sheath 25 is not used) are routed through and secured to the mounting flange 106 disposed at an end of the heater 12, thereby providing a low profile and organized arrangement of leads for the heater assembly 100. With the power cables 108 and the sheath 25 properly organized and secured to the mounting flange 106, the heater assembly 100 can be relatively easily mounted within heating target 110, which in this case is a sheath.

The temperature sensing unit of the present disclosure has the advantage of maintaining a low profile of the heater assembly while making accurate surface temperature measurement of the heater or the heating target. In addition, the temperature sensing unit can be easily mounted to any curved surface of the heater or the heating to reduce the assembling time.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A temperature sensing unit comprising:
a unitized temperature sensor for measuring a temperature of an object, the unitized temperature sensor including a portion bendable to conform to an outer surface of the object; and
a mounting member having ends attached to opposing ends of the portion of the unitized temperature sensor and securing the unitized temperature sensor on the object;
wherein the bendable portion of the unitized temperature sensor includes a first thermocouple ribbon and a second thermocouple ribbon that are joined to form a hot junction therebetween.

2. The temperature sensing unit according to claim 1, wherein the portion of the unitized temperature sensor extends around a perimeter of the object.

3. The temperature sensing unit according to claim 1, wherein the mounting member and the unitized temperature sensor jointly define a continuous, closed geometry.

4. The temperature sensing unit according to claim 1, wherein the portion of the unitized temperature sensor is in direct contact with the object.

5. The temperature sensing unit according to claim 1, wherein the first thermocouple ribbon and the second thermocouple ribbon are butt-welded.

6. The temperature sensing unit according to claim 1, wherein the unitized temperature sensor further includes a support member overlapping the first and second thermocouple ribbons for bonding the first and second thermocouple ribbons together.

7. The temperature sensing unit according to claim 1, further comprising a mounting flange at an end of the object, wherein the unitized temperature sensor includes a pair of lead wires that are routed through and secured to the mounting flange.

8. The temperature sensing unit according to claim 1, wherein the mounting member is one continuous piece.

9. The temperature sensing unit according to claim 8, wherein the mounting member is a spring.

10. The temperature sensing unit according to claim 1, wherein the first and second thermocouple ribbons each include a first portion extending along a circumferential direction of the object and a second portion extending from the first portion at an angle.

11. The temperature sensing unit according to claim 10, wherein, in each of the first and second thermocouple ribbons, the second portion is connected to the first portion to define an L shape or a T shape.

12. A temperature sensing unit for measuring a temperature of an object having a cylindrical configuration, the temperature sensing unit comprising:
a first thermocouple ribbon and a second thermocouple ribbon each defining a first portion extending along a circumferential direction of the object, the first portions of the first and second thermocouple ribbons being joined to define a thermocouple junction and being bendable to conform to an outer surface of the object; and
a mounting member directly attached to the first portions of the first and second thermocouple ribbons to secure the first thermocouple ribbon and the second thermocouple ribbon to the object.

13. The temperature sensing unit according to claim 12, wherein the first thermocouple ribbon and the second thermocouple ribbon are in direct contact with the object.

14. The temperature sensing unit according to claim 12, wherein the first thermocouple ribbon and the second thermocouple ribbon each include a second portion extending from a respective one of the first portion at an angle.

15. The temperature sensing unit according to claim 14, further comprising a pair of lead wires attached to the second portions of the first and second thermocouple ribbons.

16. A temperature sensing unit comprising:
a temperature sensor for measuring a temperature of an object, the temperature sensor including a temperature sensing element in direct contact with the object; and
a mounting member for securing the temperature sensing element of the temperature sensor to the object without covering the temperature sensing element,
wherein the temperature sensing element of the temperature sensor includes a first thermocouple ribbon and a second thermocouple ribbon that are joined to define a thermocouple junction.

17. The temperature sensing unit according to claim 16, wherein the temperature sensing element of the temperature sensor and the mounting member jointly define a continuous, closed geometry.

18. The temperature sensing unit according to claim 16, wherein the temperature sensing element is bendable to conform to an outer surface of the object.

* * * * *